UNITED STATES PATENT OFFICE.

HERBERT G. HORTON, OF TROY, NEW YORK.

IMPROVEMENT IN COMPOSITIONS FOR INK-PRESSES.

Specification forming part of Letters Patent No. 131,444, dated September 17, 1872.

*To all whom it may concern:*

Be it known that I, HERBERT G. HORTON, of Troy, in the county of Rensselaer and State of New York, have compounded an Improved Composition for Ink-Presses, of which the following is a specification:

My improved composition for ink-presses consists of compounding certain ingredients in the manner and proportions substantially as hereinafter described.

To enable others to make and use my composition, I will proceed to describe it.

First, I will name the ingredients, and the quantities or proportions thereof used, constituting my composition, which are as follows, the proportions being variable in accordance with the quantity of the material to be produced.

Four pounds (4 lbs.) of glue; five pounds (5 lbs.) of glycerine; one and one-half pound (1½ lb.) of plumbago; one-half pound (½ lb.) boiled linseed-oil; one-quarter pound (¼ lb.) lamp-black; one ounce (1 oz.) sulphate copper; three-quarters of a pound (¾ lb.) of gum-copal; two ounces (2 oz.) bone-dust.

The manner of compounding the ingredients of my composition is substantially as follows:

The glue should be soaked over night in water, then thoroughly drained, after which it should be boiled with the glycerine until united with the latter. Pour this mixture into a can or pail, and allow it to stand until cool. The said mixture, which has thus become hard, is now melted the second time, with the addition of plumbago, linseed-oil, lamp-black, and gum-copal, which, when thoroughly mixed therewith, will form the body of my composition. The sulphate of copper and bone-dust, properly mixed together, are for the purpose of furnishing a "finish" to the press made of the ingredients and in the manner above stated.

Having thus fully described my compound, what I claim, and desire to secure by Letters Patent, is—

The composition herein described, compounded of the ingredients in the manner and proportions substantially as described.

In testimony whereof I have hereunto signed my name this 23d day of July, A. D. 1872, in the presence of two subscribing witnesses.

H. G. HORTON.

Witnesses:
 HARVEY J. KING,
 HERBERT B. MILLARD.